United States Patent
Winter (10) Patent No.: US 9,286,083 B2
(45) Date of Patent: Mar. 15, 2016

(54) SATISFYING MISSING DEPENDENCIES ON A RUNNING SYSTEM

(75) Inventor: Oren Winter, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1368 days.

(21) Appl. No.: 12/207,811

(22) Filed: Sep. 10, 2008

(65) Prior Publication Data

US 2010/0064284 A1    Mar. 11, 2010

(51) Int. Cl.
*G06F 9/44* (2006.01)
*G06F 9/445* (2006.01)

(52) U.S. Cl.
CPC . *G06F 9/445* (2013.01); *G06F 8/70* (2013.01)

(58) Field of Classification Search
CPC .................................... G06F 8/61; G06F 8/71
USPC ................................................ 717/120, 121
See application file for complete search history.

(56) References Cited

U.S. PATENT DOCUMENTS

| | | | |
|---|---|---|---|
| 6,698,015 B1 * | 2/2004 | Moberg et al. | 717/154 |
| 6,698,016 B1 * | 2/2004 | Ghizzoni | 717/162 |
| 7,032,180 B2 | 4/2006 | Wilkinson et al. | 715/762 |
| 7,210,141 B1 | 4/2007 | Nathan et al. | 717/168 |
| 7,343,596 B1 | 3/2008 | Geisinger | 717/143 |
| 2002/0087949 A1 * | 7/2002 | Golender et al. | 717/124 |
| 2003/0140253 A1 * | 7/2003 | Crosbie et al. | 713/201 |
| 2003/0221190 A1 | 11/2003 | Deshpande et al. | 717/171 |
| 2004/0250246 A1 | 12/2004 | Veselov et al. | 717/169 |
| 2005/0120344 A1 | 6/2005 | Asare et al. | 717/174 |
| 2005/0144619 A1 * | 6/2005 | Newman | 717/177 |
| 2005/0240815 A1 * | 10/2005 | Purkeypile et al. | 714/15 |
| 2006/0277542 A1 | 12/2006 | Wipfel | 717/174 |
| 2007/0074197 A1 | 3/2007 | Buckley et al. | 717/168 |
| 2007/0198975 A1 * | 8/2007 | Alnas et al. | 717/168 |
| 2007/0214178 A1 | 9/2007 | Sheffler et al. | 707/104.1 |
| 2007/0294667 A1 | 12/2007 | Caceres et al. | 717/120 |

OTHER PUBLICATIONS

Alois Kraus, "Extend the Enterprise Library Config Tool—A Configurable Assembly Loader," http://geekswithblogs.net/akrausl/archive/2006/03/05/71481.aspx, 5 pgs.

(Continued)

*Primary Examiner* — Wei Zhen
*Assistant Examiner* — Lanny Ung
(74) *Attorney, Agent, or Firm* — John Jardine; Judy Yee; Micky Minhas (57) ABSTRACT

A method for satisfying loader dependencies on a running embedded computing device is provided. When a software application is loaded on a running embedded computing device, one or more binary files are identified that need to be loaded in order to run the software application. A determination is made as to whether the identified binary files are stored on the embedded computing device. If one or more of the identified binary files are missing from the embedded computer device, one or more file storage devices are identified that contain the missing binary files. The missing binary files are obtained from the one or more file storage devices during runtime and used to complete the load of the software application.

20 Claims, 4 Drawing Sheets

(56) References Cited

OTHER PUBLICATIONS

C. Hynes, "Managing Shared Libraries and Installing Software from Tarballs," http://www.2000trainers.com/linux/linux-shared-libraries-tarballs/, Jun. 7, 2002, 8 pgs.

"Mono Package and Deployment Framework", Codename "Spock", http://zbowling.com/monodevelop/MonoPackageFramework.pdf, Feb. 26, 2005, 3 pgs.

Quinnell, Richard, "Embedded Java", Mar. 1, 2002 (6 pgs). http://www.embedded.com/design/programming-languages-and-tools/4018044/Embedded-Java.

McManis, Chuck, The basics of Java class loaders, Oct. 1, 1996 (8pgs). http://www.javaworld.com/article/2077260/learn-java/learn-java-the-basics-of-java-class-loaders.html.

Quinnell, Richard, Embedded Java dated Mar. 1, 2002 (6 pgs). http://www.embedded.com/design/programming-languages-and-tools/4018044/Embedded-Java.

* cited by examiner

SATISFYING MISSING DEPENDENCIES ON A RUNNING SYSTEM

BACKGROUND

Embedded computing devices such as thin clients, point of sale devices, etc. are typically pre-loaded with a subset of a full client operating system. This is usually done in order to save disk/RAM space on the embedded computing device. The subset of the operating system that is loaded is intended to support the software applications that are expected to be run on the embedded computing device.

Sometimes a user will try to install a new software application that is not supported by the subset of the full client operating system that is loaded on the embedded computing device. A user that attempts to load a non-supported software application may not be able to complete the load because one or more binary files may be missing from the operating system loaded on the embedded device.

SUMMARY

According to one embodiment, an embedded computing device includes a loader module and a dependency finder module. The loader module loads one or more software applications into the embedded computing device. At least one of the one or more software applications has a dependency on one or more binary files needed to run the at least one of the one or more software applications. The dependency finder module monitors the operation of the loader module and identifies any binary files needed to run the one or more software applications being loaded that are missing from the embedded computing device. The dependency finder module determines the location of the identified binary files on one or more file storage devices and obtains the identified binary files from the one or more file storage devices. The dependency finder module identifies the missing binary files and obtains the identified missing binary files and the loader module loads the one or more software applications while the embedded computing device is running.

According to another embodiment, a method for satisfying loader dependencies on an embedded computer device during runtime is provided. When the loading of a software application is initiated on an embedded computing device, one or more binary files are identified that need to be loaded in order to run the software application. A determination is made as to whether the needed binary files are stored on the embedded computing device. If the needed binary files are stored, the loading of the software application can successfully complete. If the needed binary files are not stored on the embedded computing device, each missing binary file is mapped into a software component that includes the missing binary file. One or more file storage devices that contain the mapped software components are identified. Each mapped software component includes at least one missing binary file. The one or more mapped software components are obtained from the one or more file storage devices as a runtime operation of the embedded computing device. The one or more mapped software components obtained are installed on the embedded computing device. The one or more installed mapped software components are used to complete loading the software application on the embedded computing device.

According to another embodiment, a computer readable storage medium having computer-executable instructions which when executed implement a method for satisfying loader dependencies on a running embedded computing device is provided. When the loading of a software application is initiated on an embedded computing device, one or more binary files are identified that need to be loaded in order to run the software application. A determination is made as to whether the one or more identified binary files are missing from the embedded computing device. If it is determined that one or more identified binary files are missing from the embedded computing device, one or more file storage devices are identified that contain the identified missing binary files. The identified missing binary files are obtained from the one or more storage devices as a runtime operation of the embedded computing device. The binary files obtained from the one or more storage devices are used to complete the load of the software application on the embedded computing device.

This Summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

DETAILED DESCRIPTION

The present application is directed to systems and methods for identifying binary files needed to load a software application on an embedded computing device and to dynamically obtain any needed files from a file storage device over a network so that the software application can be loaded. The binary files needed to run the software application are dependencies of the software application and obtaining the needed files during the loading process satisfies the dependencies. The systems and methods are designed to support the loading of software applications during runtime and in a manner that is transparent to a user.

Figure 1:
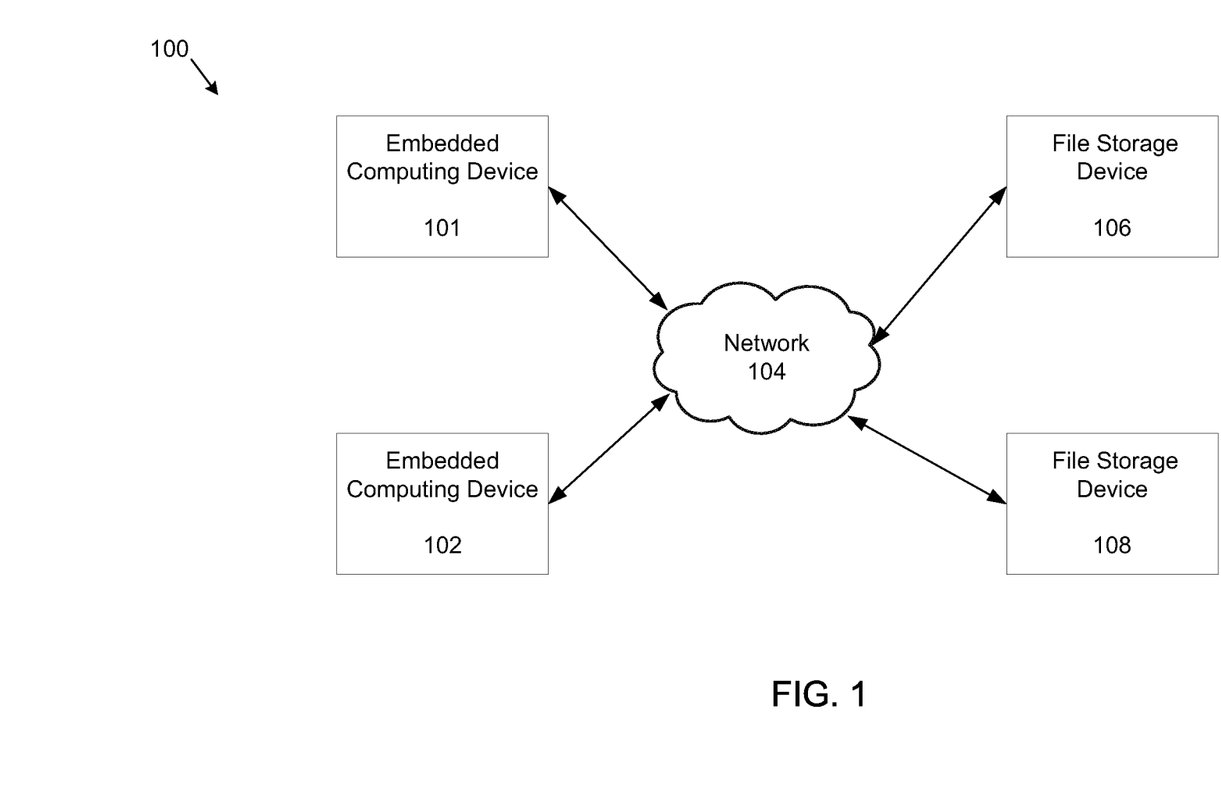
FIG. 1 shows an example system for satisfying dependencies during the loading of a software application on an embedded computing device during runtime.

FIG. 1 shows an example system 100 for identifying and satisfying binary file dependencies during runtime for embedded computing devices. The system 100 includes embedded computing devices 101, 102, a network 104 and file storage devices 106, 108. More or fewer embedded computing devices and file storage devices can be used.

In example embodiments, the embedded computing devices 101, 102 are computing devices such as thin client computers, point of sale devices, kiosks, etc. The embedded computing devices 101, 102 can include input/output devices, a central processing unit ("CPU"), a data storage device, and a network device.

The file storage devices 106, 108 are storage devices that are accessible through a network 104. For example, the file storage device 106 can be a server. The server can include input/output devices, a central processing unit ("CPU"), a data storage device, and a network device. The file storage device 106 may also be a file service that is used to obtain files over the network. An example of a file service is Microsoft Update from Microsoft Corporation of Redmond, Wash. Other examples of file services and file storage devices are possible.

Figure 2:
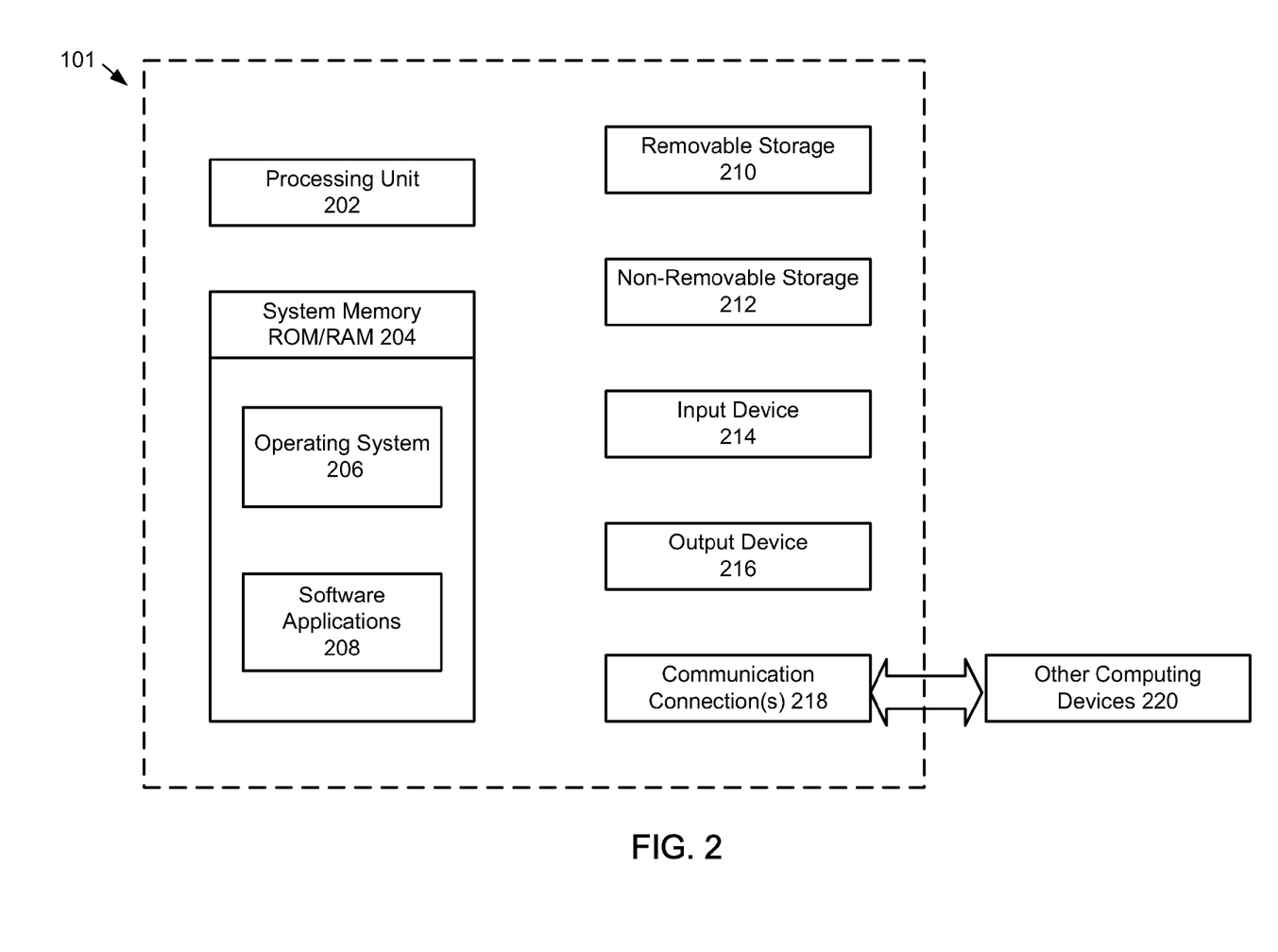
FIG. 2 shows an operating environment in which an embedded computing device can satisfy loading dependencies during runtime.

Referring now to FIG. 2, in example embodiments, each embedded computing device 101, 102 shown FIG. 1 is a computer system. For example, the embedded computing device may be a thin client implementing a subset of a full-operating system. In other embodiments, the embedded computing device may be a special purpose computer system dedicated to performing a specific function, for example a point-of-sale device. The embodiments may be practiced in distributed computing environments, where tasks are performed by remote processing devices that are linked through a communications network. In a distributed computing environment, program modules may be located in both local and remote memory storage devices. Embodiments may be implemented as a computer process (method), a computing system, or as an article of manufacture, such as a computer program product or computer readable media. The computer program product may be a computer readable storage media readable by a computer system and encoding a computer program of instructions for executing a computer process. The computer program product may also be a propagated signal on a carrier readable by a computing system and encoding a computer program of instructions for executing a computer process.

With reference to FIG. 2, each embedded computing device 101, 102 typically includes at least one processing unit 202 and system memory 204. Depending on the exact configuration and type of computing device, the system memory 204 may be volatile (such as RAM), non-volatile (such as ROM, flash memory, etc.) or some combination of the two. System memory 204 typically includes an operating system 206 suitable for controlling the operation of a networked personal computer, such as the WINDOWS® operating systems from Microsoft Corporation of Redmond, Wash. The system memory 204 may also include one or more software applications 208 and may include program data.

The embedded computing devices 101, 102 may have additional features or functionality. For example, the embedded computing devices 101, 102 may also include additional data storage devices (removable and/or non-removable) such as, for example, magnetic disks or optical disks. Such additional storage is illustrated in FIG. 2 by removable storage 210 and non-removable storage 212. Computer readable storage media may include volatile and nonvolatile, removable and non-removable media implemented in any method or technology for storage of information, such as computer readable instructions, data structures, program modules, or other data. System memory 204, removable storage 210 and non-removable storage 212 are all examples of computer readable storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by embedded computing devices 101, 102. Any such computer storage media may be part of embedded computing devices 101, 102. Embedded computing devices 101, 102 may also have input device(s) 214 such as keyboard, mouse, pen, voice input device, touch input device, etc. Output device(s) 216 such as a display, speakers, printer, etc. may also be included.

The embedded computing devices 101, 102 may also contain communication connections 218 that allow the devices to communicate with other computing devices 220 (e.g., file storage device 106) over a network, such as network 104, in a distributed computing environment, for example, an intranet or the Internet. Communication connection 218 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media. The term computer readable media as used herein includes both storage media and communication media.

The file storage devices 106, 108 can be configured in a manner similar to that of the embedded computing devices 101, 102 described above.

Figure 3:
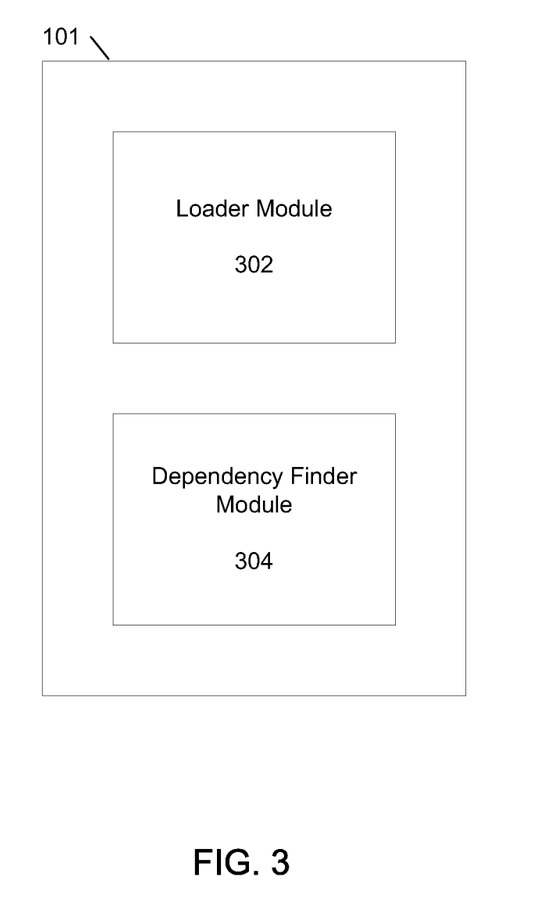
FIG. 3 shows example functional modules for an example embedded computing device.

FIG. 3 shows the example embedded computing device 101 in more detail. The example embedded computing device 101 includes an example loader module 302 and an example dependency finder module 304. The example loader module 302 loads one or more software applications on the example embedded computing device 101. Typically, an embedded computing device is pre-installed with operating system components that support the software applications that the embedded computer device are expected to run. The operating system components are typically a subset of a full operating system, for example a subset of the WINDOWS® operating systems from Microsoft Corporation of Redmond, Wash. However, sometimes a user tries to install a new software application that may not be supported by the operating system components installed on the embedded computing device. There may be one or more binary files needed to load the software application that are not included in the subset of operating system components installed. These binary files need to be identified and obtained before the software application can load. The one or more binary files that are needed are called dependencies because the software application is dependent on them for loading. The needed binary files may include library files, for example dynamic link library files, executable files, etc. The loader module 302 operates in conjunction with the dependency finder module 304 to identify and obtain the needed binary files.

The example dependency finder module 304 monitors the operation of the loader module 302 and identifies any dependencies in each software application to be loaded. If it is determined that a dependency exists, the example dependency finder module 304 determines whether the one or more binary files that are needed are contained on the embedded computing device. If the one or more binary files that constitute the dependency cannot be located on the embedded computing device, the needed binary files are obtained from a file storage device 106, 108 on the network 104.

When obtaining files, it is often more efficient to obtain a software component that contains the file rather than obtaining each file separately. Often a software component may include more than one needed file, making the processes of obtaining files more efficient. To this end, the example dependency finder module 304 may map each needed binary file into a software component that contains the binary file. The example dependency finder module 304 also determines the location of the component on a file storage device on a network, for example file storage devices 106, 108 on network 104. The example dependency finder module 304 obtains the component from the file storage device and installs the component on the embedded computing device.

The example dependency finder module 304 identifies dependencies in a number of ways. In one embodiment, the example dependency finder module 304 identifies dependencies by using a header included with the software application to be loaded. The header lists all binary files that need to be imported by the software application in order for the software application to run. For each binary file listed in the header, the example dependency finder module 304 determines whether the binary file is already stored on the embedded computing device. If the binary file is already stored on the embedded computing device, the binary file can be loaded by the loader module 302. Otherwise, the binary file is obtained from file storage device 106, 108 on the network 104.

In other embodiments, the example dependency finder module identifies dependencies by monitoring errors returned when attempting to open files. For example, in an embodiment using the WINDOWS® operating systems from Microsoft Corporation of Redmond, Wash., the example dependency finder module 304 identifies dependencies by using the operating system registry of the embedded computing device. In this embodiment, the example dependency finder module 304 monitors certain registry API calls and determines if there are any key not found errors in these calls. If a registry key is missing, the example dependency finder module 304 creates the registry key, thereby satisfying the dependency. For example, an API call to RegOpenKey(specific key) may return a KEY_NOT_FOUND error or a similar type of error. In this example, the dependency finder module 304 creates a registry entry for the specific key in order to satisfy the dependency.

In another embodiment, for example an embodiment using the Linux operating system, the example dependency finder module 304 identifies dependencies by monitoring attempts to obtain configuration data or other data on the embedded computing device. For example, if an error is returned when attempting to open a file containing configuration data, and the error indicates that the file cannot be located on the embedded computing device, the dependency finder module 304 obtains the file from file storage device 106, 108 on the network 104.

In another embodiment, the example dependency finder module 304 identifies dependencies by monitoring operating system process calls and looking for file not found errors. If it is determined that a needed binary file is not stored on the embedded computing device, the binary file is obtained from file storage device 106, 108 on the network 104. For example, in an embodiment using the WINDOWS® operating systems from Microsoft Corporation of Redmond, Wash., a call to CreateProcess( . . . ) may return a file not found error, indicating that the file needs to be obtained. In a Linux embodiment, an execve command may return an error indicating that a file needs to be obtained.

Figure 4:
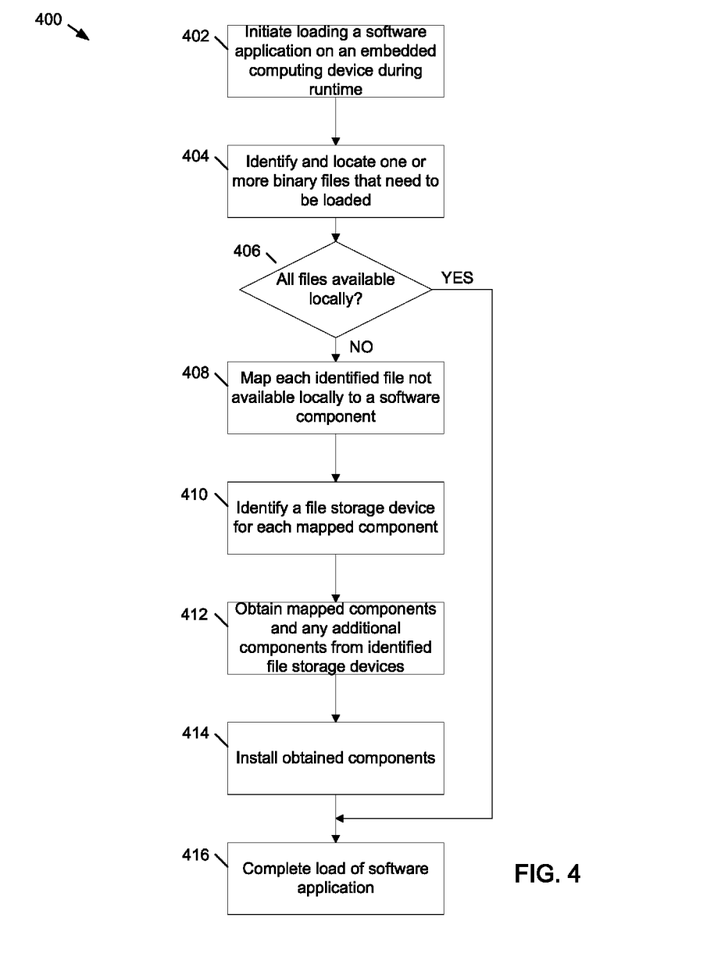
FIG. 4 shows a flowchart for an example method for satisfying dependencies on an embedded computing device during runtime.

FIG. 4 is a flowchart showing a method for satisfying dependencies on an embedded computing device during runtime. At operation 402, the loading of a software application is initiated on an embedded computing device during runtime. At operation 404, one or more binary files that are needed to load the software application are identified and located on the embedded computing device. The binary files may be identified from a header in the software application, by monitoring API calls to a registry on the embedded computing device, by monitoring process calls on the embedded computing device or by similar methods. If it is determined, at operation 406, that the embedded computing device has all the binary files it needs to complete the load of the software application, the load proceeds to completion at operation 416. However, if the embedded computing device is missing one or more of the identified binary files, these files need to be obtained in order for the software application to be loaded.

At operation 408, each identified binary file not stored on the embedded computing device is mapped to a software component that contains the binary file. At operation 410, a file storage device is identified that contains each mapped software component. There may be one or more file storage devices, each file storage device being accessible by the embedded computing device over a network. At operation 412, the mapped software components are obtained from the file storage devices. In addition, at operation 412 one or more of the file storage devices may include logic that determines if additional components are needed. For example, if a particular dynamic link library component is being requested, a file storage device may determine that an additional component such as Internet Explorer needs to be added to the embedded computer device. In this example, Internet Explorer is provided by the file storage device in addition to the mapped software components.

At operation 414 the obtained software components are installed on the embedded computing device. At operation 416, with the needed binary files obtained, the load of the software application is completed. In an alternate embodiment, the needed binary files are obtained directly from the file storage device without mapping to software components.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An embedded computing device, the embedded computing device comprising:
a processing unit;
a memory having computer readable instructions, which when executed by the processing unit cause the embedded computing device to provide:
a loader module that loads one or more software applications into the embedded computing device, at least one of the one or more software applications having a dependency on one or more binary files needed to run the at least one of the one or more software applications;
a dependency finder module that monitors operation of the loader module and identifies any binary files needed to run the one or more software applications being loaded that are missing from the embedded computing device, the dependency finder module mapping two or more binary file missing from the embedded computing device into a single software component to be loaded, the single software component including a plurality of files including two or more missing binary files, the dependency finder module determining location of the single software component including the plurality of files and the two or more missing binary files on one or more file storage devices and obtaining the single software component including the plurality of files and the two or more missing binary files from the one or more file storage devices;
wherein the dependency finder module identifies the single software component including the plurality of files and the two or more missing binary files and obtains the single software component including the two or more missing binary files and wherein the loader module loads the one or more software applications while the embedded computing device is running.

2. The embedded computing device of claim 1, wherein the dependency finder module obtains the single software component from the one or more file storage devices and installs the single software component on the embedded computing device.

3. The embedded computing device of claim 1, wherein the single software component including the plurality of files and the two or more missing binary files needed to run each software application are listed in a header file in the software application, the dependency finder module using the header file to identify the single software component including the plurality of files and the two or more missing binary files needed to run the software application.

4. The embedded computing device of claim 2, wherein the embedded computing device includes an API for obtaining data from a registry on the embedded computing device, the dependency finder module further identifying dependencies by monitoring calls to a registry API.

5. The embedded computing device of claim 4, wherein a dependency is identified by an error returned by the registry API.

6. The embedded computing device of claim 1, wherein the embedded computing device includes a command for opening a file, the embedded computing device also including one or more files containing configuration data, the dependency finder module further identifying dependencies by monitoring one or more calls to open the one or more files containing configuration data, a dependency being identified by an error returned by the command for opening a file when said command attempts to open one or more of the one or more files containing configuration data.

7. The embedded computing device of claim 1, wherein the dependency finder module monitors further identifies dependencies by monitoring a call to create a process on the embedded computing device, a dependency being identified by an error returned by the call to create a process.

8. The embedded computing device of claim 7, wherein the call to create a process is a CreateProcess command.

9. The embedded computing device of claim 7, wherein the call to create a process is a execve command.

10. The embedded computing device of claim 1, wherein the file storage device used to obtain the two or more missing binary files is a server.

11. The embedded computing device of claim 1, wherein the file storage device used to obtain the two or more missing binary files comprises a file service.

12. A method for satisfying loader dependencies on an embedded computing device during runtime, the method comprising:
   initiating the loading of a software application on the embedded computing device, the loading of the software application being performed as a runtime operation of the embedded computing device;
   identifying two or more binary files that need to be loaded in order to run the software application;
   determining if the two or more binary files are stored on the embedded computing device;
   mapping the two or more binary files missing from the embedded computing device into a single software component that includes a plurality of files including two or more missing binary files;
   identifying one or more file storage devices that contain the single software component, the single software component including the plurality of files including the two or more missing binary files;
   obtaining the single software component from the one or more file storage devices as a runtime operation of the embedded computing device;
   installing the single software component on the embedded computing device as a runtime operation of the embedded computing device; and
   using the single software component to complete the load of the software application on the embedded computing device.

13. The method of claim 12, further comprising using a header file in the software application to identify the two or more binary files that need to be loaded in order to run the software application.

14. The method of claim 12, further comprising, monitoring error responses from API calls to a registry on the embedded computer to identify the two or more binary files that need to be loaded in order to run the software application.

15. The method of claim 12, further comprising, monitoring error responses from calls to create processes on the embedded computing device to identify the two or more binary files that need to be loaded in order to run the software application.

16. The method of claim 12, further comprising identifying additional software components, on the one or more file storage devices, that need to be loaded to use the single software component.

17. A computer readable storage medium, not including a signal, containing computer executable instructions which when executed implement a method for satisfying loader dependencies on a running embedded computing device, the method comprising:
   initiating the loading of a software application on an embedded computing device, the loading of the software application being performed as a runtime operation of the embedded computing device;
   identifying two or more binary files that need to be loaded in order to run the software application;
   determining if the two or more binary files are missing from the embedded computing device;
   mapping two or more binary files missing from the embedded computing device into a single software component that includes a plurality of files including two or more missing binary files;
   identifying one or more file storage devices that contain the single software component, the single software component including the plurality of files including the two or more missing binary files;
   obtaining the single software component from the one or file storage devices as a runtime operation of the embedded computing device; and
   using the single software component obtained from the one or more file storage devices to complete the load of the software application on the embedded computing device.

18. The computer readable storage medium, not including a signal, of claim 17, further comprising using a header file in the software application to identify the two or more binary files that need to be loaded in order to run the software application.

19. The computer readable storage medium, not including a signal, of claim 17, further comprising, monitoring error responses from API calls to a registry on the embedded computer to identify the two or more binary files that need to be loaded in order to run the software application.

20. The computer readable storage medium, not including a signal, of claim 17, further comprising, monitoring error responses from calls to create processes on the embedded computing device to identify the two or more binary files that need to be loaded in order to run the software application.

* * * * *